H. V. HOLMAN.
FILTER.
APPLICATION FILED APR. 22, 1909.

966,918.

Patented Aug. 9, 1910.
2 SHEETS—SHEET 1.

Witnesses:

Inventor:
Harry V. Holman.
by
Bulkley Durand & Guy
attys.

H. V. HOLMAN.
FILTER.
APPLICATION FILED APR. 22, 1909.

966,918.

Patented Aug. 9, 1910.
2 SHEETS—SHEET 2.

Witnesses:

Inventor:
Harry V. Holman
by Bulkley, Durand & Drury
Attys

UNITED STATES PATENT OFFICE.

HARRY V. HOLMAN, OF COLORADO SPRINGS, COLORADO.

FILTER.

966,918.     Specification of Letters Patent.     Patented Aug. 9, 1910.

Application filed April 22, 1909. Serial No. 491,425.

*To all whom it may concern:*

Be it known that I, HARRY V. HOLMAN, a citizen of the United States of America, and resident of Colorado Springs, Colorado, have invented a certain new and useful Improvement in Filters, of which the following is a specification.

My invention relates to improvements in filters, and is especially adapted for the treatment of slimes and other material resulting from the treatment of ores containing precious metals by the cyanid or some other process.

The object of my invention is to provide a device by the use of which the material can be quickly and cheaply filtered and discharged without liability of clogging the device.

A further object is the use of improved agitating and discharging means that can be readily adjusted to fit varying conditions.

A further object is the production of a machine that can be cheaply constructed and one that is least liable to get out of order.

These and such other objects as may be hereinafter set forth, are shown in the accompanying drawings, in which—

Figure 1:
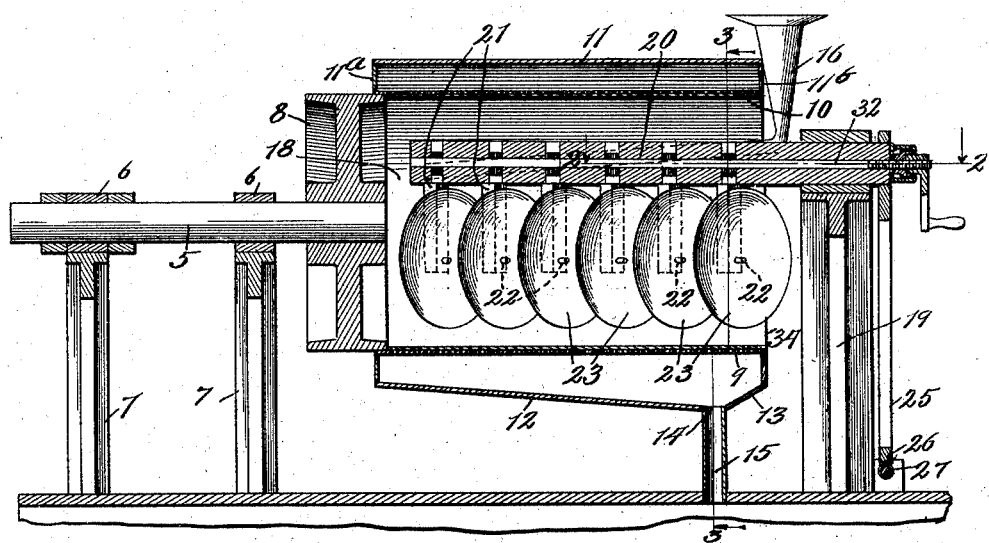
Figure 2:
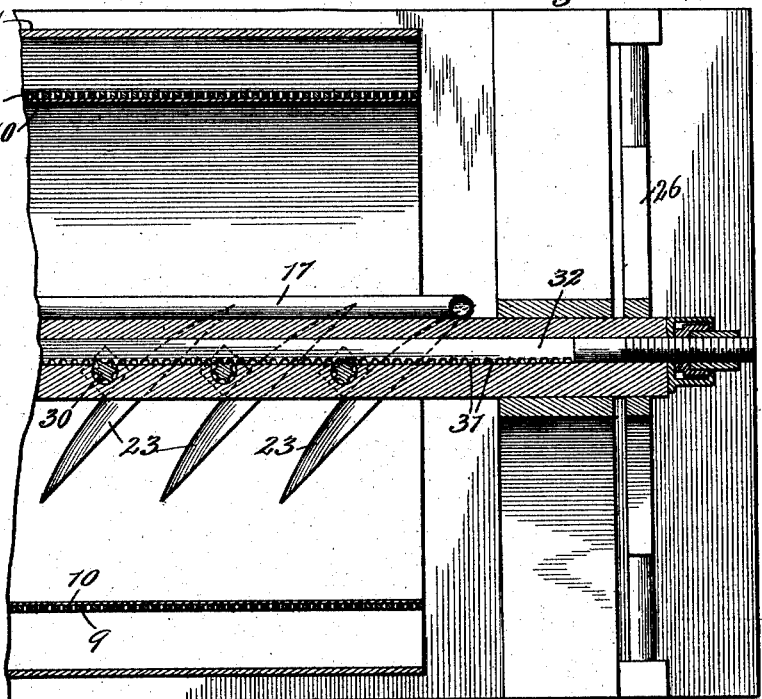
Figure 3:
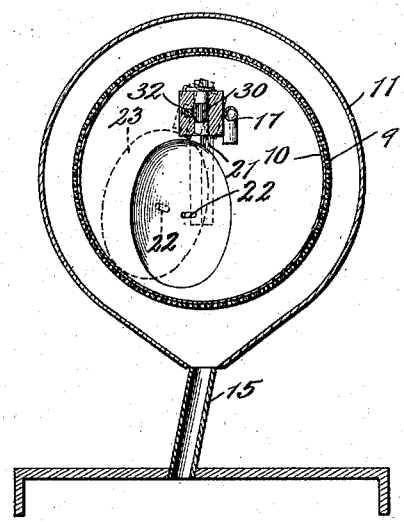
Figure 4:
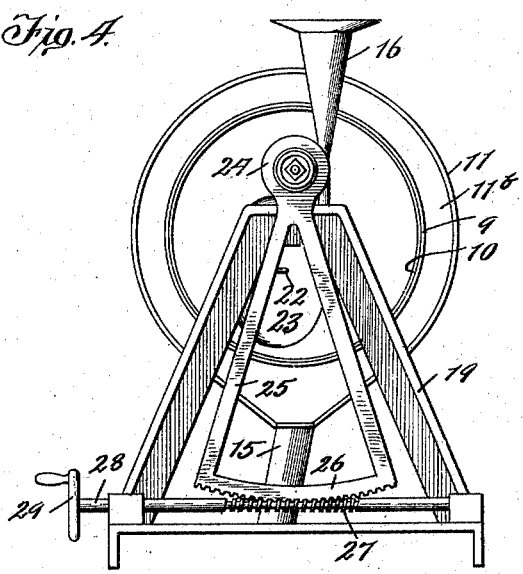

Figure 1 represents a longitudinal sectional view of my machine with the disks in plan. Fig. 2 represents a horizontal sectional view on the line 2—2 of Fig. 1, looking in the direction indicated by the arrows. Fig. 3 represents a vertical sectional view on the line 3—3 of Fig. 1, looking in the direction indicated by the arrows. Fig. 4 represents an end view of my machine.

Like numerals of reference indicate like parts in the several figures of the drawings.

Referring now to the drawings—a shaft 5 is journaled in bearings 6 mounted on a suitable supporting frame 7. A driving pulley 8 is mounted on the end of the shaft 5 and serves also as a support for the rotor or screen 9. This rotor is cylindrical in shape and formed from perforated metal or wire screen and on the inner face I prefer to place a canvas filter 10. Surrounding the rotor or screen is an outer casing 11 preferably flanged at both ends at 11ª and 11ᵇ, and substantially cylindrical in form, as shown in Fig. 3. The bottom line of this casing is broken, the two portions 12 and 13 sloping slightly downwardly from the ends, as shown in Fig. 1, and meeting at 14, at which point an outlet pipe 15 is placed, forming a liquid discharge. A feed 16 communicates with the feed pipe 17, which slopes within the rotor discharging at its extreme end 18.

Opposite the open end of the rotor is mounted a frame 19 on which is supported a disk supporting shaft 20. A plurality of arms 21 extend downwardly from said shaft, each provided with disk bearings 22 on which the disks 23 are loosely journaled. A casting 24 is fitted over the outer end of the shaft 20, provided with downwardly extending arms 25 and terminating in a segmental toothed rack 26, the teeth of which mesh with a worm gear 27 on a rod 28 on the end of which is placed a small wheel 29. By revolving this wheel the shaft 20 may be rocked or shifted, thus varying the distance between the inner surface of the rotor and the edges of the disks. In dotted lines in Fig. 3, I have shown a shifted position of the disks, in which the edges are almost in contact with the inner surface of the rotor. I am aware that there are various methods by the use of which this change in position of the disks may be effected, but have considered it sufficient to show but one. It may also at times be advisable to change the angle of direction of the disks to accommodate the treatment of different materials. To this end I have shown the arms 21 provided with a toothed section 30 meshing with the teeth 31 of a rack 32.

Referring now to the operation of my device, the slime or material from which it is desired to filter the liquid is run into the feed 16, and passes through the pipe 17, and is fed into the cylinder at its closed end. The rotor or screen is revolved at a high rate of speed throwing the liquid through the canvas and perforated metal. The disks have very little action on liquids or solids in suspension. As soon, however, as sufficient liquid has been forced from the material and the mass assumes a solid or semi-solid condition, the disks immediately take hold of the material and work it toward the discharge 34. The disks are journaled so as to revolve freely on contact with solid or semi-solid material and offer little resistance to the revolution of the screen during the operation, thus making it unnecessary to provide any great amount of power.

In the operation of a centrifugal filter, the higher the speed the harder the material will pack against the screen under the influence of centrifugal action. When a fixed screw conveyer is used, a smooth bore is cut, leaving an outer shell of hard material that can only be removed by stopping the machine and cleaning out the solid cake. In this case, the smooth inner surface of the material offers no resistance to the passage of the semi-liquid slime which is often carried out unfiltered. By the use of my improved device, however, the revolution of the screen or rotor about the disks leaves the inner surface of the material in a series of ridges and depressions very much of the same cross-section as that of a corrugated metal shell. The very shape itself, therefore, tends to impede the too rapid discharge of the unfiltered slimes. The disks being free to revolve are not subject to great wear, while a fixed conveyer would soon be worn away at the edges, thus thickening the material left and impairing the efficiency of the machine. By rocking the shaft 20, the disk blades can be brought to almost touch the inner face of the screen, and thus clean out the rotor at any time when desired.

A fixed screw machine is apt to become stuck if overfed or run too fast. The disks are not so likely to stick in either contingency, but if such should happen, the adjustment of the disks can be used for "backing" the disks away from the screen and out of the sand. Then, starting the machine, (which is free by reason of the backing away of the disks), the surplus of solid matter can be gradually removed by bringing disks back to their running position slowly. The only remedy for such a case in the fixed screw machine is to take it apart and clean by hand, or by "forcing," with the consequent danger of breakage.

The screen forming the rotor is aided in its work by canvas or other fine filter material and by allowing some of the solid matter to remain on the inside of the screen, forming a "sand filter" through which the liquid must pass. Different classes of material require different thicknesses of sand filter. The fixed screw provides no adjustment of depth of the sand filter, except by changing to screws of different diameter, and the sand filter of a certain screw is constantly increased in depth as the edge of the screw is worn off. The adjustment of the disks provides an instant change of the sand filter to meet varying conditions. The sand filter is apt to become so dirty as to greatly interfere with the passing of the liquid through it. The fixed screw provides no means of cleaning the sand filter except by removing the screw and cleaning by hand. The adjustment of the disks makes such cleaning possible without stopping the machine. By bringing the disks to touch or nearly touch the rotor, practically all of the sand filter will be removed by the disks themselves. Then, by returning the disks to their proper position by means of adjustment and feeding clean filter sand, this will be evenly distributed over the screen by the disks.

The terms "perforated cylinder" and "cylindrical screen" are synonymous in this application.

I am aware that the results of my invention may be accomplished in other ways, and by other means than those described in this specification, but none of them can utilize the disks either fixed or adjustable or their equivalents within the rotor without coming within the claims of my invention. So, also, it might be found advisable to provide two or more sets of disks bearing at different or equi-distant points within the rotor, thus balancing the pressure on the screen, one disk being set to cut down the ridge left by the other set, thus forming more ridges and providing a thinner sand filter.

I claim:

1. A filter comprising an outer shell, an inner rotating cylindrical screen, and means for agitating and progressing the material within said inner cylinder.

2. A filter comprising an outer shell, an inner rotating cylindrical screen, and disk means for agitating and progressing the material within said inner cylinder.

3. A filter comprising an outer shell, an inner rotating perforated cylinder, and adjustable means for agitating and progressing the material within said inner cylinder.

4. A filter comprising an outer shell, an inner rotating perforated cylinder, disk means for agitating and progressing the material within said inner cylinder, and means for varying the position of said disks with respect to said cylinder.

5. A filter comprising an outer shell, an inner rotating perforated cylinder, disk means for agitating and progressing the material within said inner cylinder, and means for varying the inclination of said disks.

6. A filter comprising an outer shell, an inner rotating perforated cylinder, disk means for agitating and progressing the material within said inner cylinder, and means for moving said disks toward or away from the adjacent inner periphery of said cylinder.

7. A filter comprising an outer shell, an inner rotating perforated cylinder, means for agitating and progressing the material within said inner cylinder, means for introducing material within said inner cylinder, means for agitating said material and progressing it through said cylinder, and means for withdrawing the liquid filtered from said material.

8. A filter comprising an outer shell, an inner rotary perforated cylinder, series of agitating disks within said inner cylinder, and means for varying the position and angularity of said disks.

9. A filter comprising an outer shell, an inner rotary perforated cylinder, a series of agitating disks mounted on an axis within said inner cylinder, said axis being eccentric to the center line of said cylinder.

10. A filter comprising an outer shell, an inner rotary perforated cylinder, a series of agitating disks mounted on an axis within said inner cylinder, said axis being eccentric to the center line of said cylinder, and means for revolving said axis, thereby shifting the position of said disk with relation to the inner periphery of said cylinder.

11. A filter comprising an outer shell, an inner rotary perforated cylinder, a series of agitating disks mounted on an axis within said inner cylinder, said axis being eccentric to the center line of said cylinder, means for revolving said axis, thereby shifting the position of said disks with relation to the inner periphery of said cylinder, and means for shifting the angular position of said disks.

12. A filter comprising an outer shell, an inner rotary perforated cylinder, additional filtering means on the inner face of said cylinder, a series of agitating disks within said inner cylinder, and means for varying the position and angularity of said disks.

13. A filter comprising an outer cylinder, an inner rotary cylinder, a sand filter on its inner periphery, and means for varying the thickness of said sand filter.

14. A filter comprising an outer shell provided with a fluid discharge pipe, a perforated inner rotary cylinder, a source of power for operating said inner cylinder, additional filtering means on the inner periphery of said cylinder, means for feeding material into said cylinder, and a series of adjustable disks mounted therein and arranged to discharge the excess of filtered material from said cylinder.

15. A filter comprising an outer shell provided with a fluid discharge pipe, a perforated inner rotary cylinder, a source of power for operating said inner cylinder, additional filtering means on the inner periphery of said cylinder, means for feeding material into said cylinder, and a series of adjustable disks mounted therein adjusted to permit a predetermined amount of said filtered material to remain on the inner periphery of the cylinder as a sand filter and to discharge the excess therefrom.

16. A filter comprising an outer cylinder, an inner rotary cylinder, a sand filter on its inner periphery, means for varying the thickness of said sand filter, and means for retarding the discharge of fluid material fed within said inner cylinder.

17. A filter comprising an outer cylinder, an inner rotary cylinder, a sand filter on its inner periphery, means for varying the thickness of said sand filter, and means for retarding the discharge of fluid material fed within said inner cylinder, said means comprising a series of corrugations on the inner face of said filter.

18. A machine of the class described, comprising a pair of receptacles one within the other and a sand filter on the inner periphery of said inner receptacle, and means for agitating material within said last-named receptacle.

19. A filter comprising an outer shell, an inner foraminous rotor, and means for agitating and progressing material within said rotor.

20. A filter comprising an outer shell, an inner barrel having a foraminous periphery, and disk means for agitating and progressing materials within said barrel.

Signed by me at Colorado Springs, Colorado, this 7th day of April, 1909.

HARRY V. HOLMAN.

Witnesses:
CHARLES V. TURNER,
H. H. McCOMBS.